United States Patent [19]

Rotolico et al.

[11] 4,381,898

[45] May 3, 1983

[54] DEVICE FOR THE CONTROLLED FEEDING OF POWDER MATERIAL

[75] Inventors: Anthony J. Rotolico, Hauppauge; Eduardo Romero, Coram; John E. Lyons, Levittown, all of N.Y.

[73] Assignee: Eutectic Corporation, Flushing, N.Y.

[21] Appl. No.: 226,756

[22] Filed: Jan. 21, 1981

[51] Int. Cl.$^3$ .............................................. B65G 53/40
[52] U.S. Cl. ...................................... 406/118; 406/14; 406/30; 406/137; 406/138; 406/144
[58] Field of Search ....................... 406/12, 14, 28, 29, 406/30, 118, 137, 138, 144; 239/85, 654

[56] References Cited

U.S. PATENT DOCUMENTS

| | | | |
|---|---|---|---|
| 2,919,160 | 12/1959 | Blackburn | 406/144 X |
| 3,163,329 | 12/1964 | Mornas | 406/30 X |
| 3,220,778 | 11/1965 | Aller | 406/118 |
| 3,365,242 | 1/1968 | Marchetti | 406/14 |

FOREIGN PATENT DOCUMENTS 1382574  2/1975  United Kingdom ................ 406/144

*Primary Examiner*—Jeffrey V. Nase
*Attorney, Agent, or Firm*—Hopgood, Calimafde, Kalil, Blaustein & Judlowe

[57] ABSTRACT

The invention contemplates a powder-feeding system for gas-propelled delivery of a powder to be controllably supplied, as to a flame-spraying gas torch or to a transferred-arc plasma torch. A fluidizing chamber receives (a) fluidizing-gas flow from below a porous screen, and (b) a restricted gravitational flow of powder at a relatively small central discharge location above the porous screen. A gas conduit extends transversely through the chamber between the powder-discharge location and the porous screen; it has a carrier-gas supply connection at one end and a gas-propelled powder-delivery connection at its other end. The conduit also has an upwardly extending opening virtually beneath and facing the powder-discharge location, but a shed interposed between this opening and the powder-discharge location sufficiently overlaps the opening to assure that no powder will pass through the opening and into the conduit unless it has been gas-fluidized. The powder-discharge flow is blocked to gas flow when powder is being delivered by the carrier-gas flow, but the powder delivery is terminated promptly upon gas-venting the fluidizing chamber, via the powder-discharge flow or otherwise.

39 Claims, 8 Drawing Figures

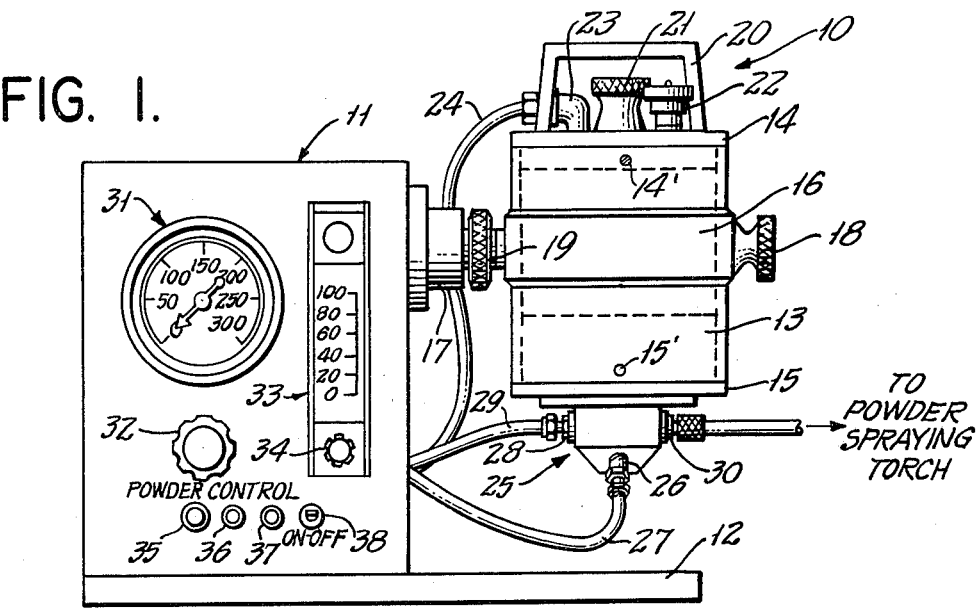
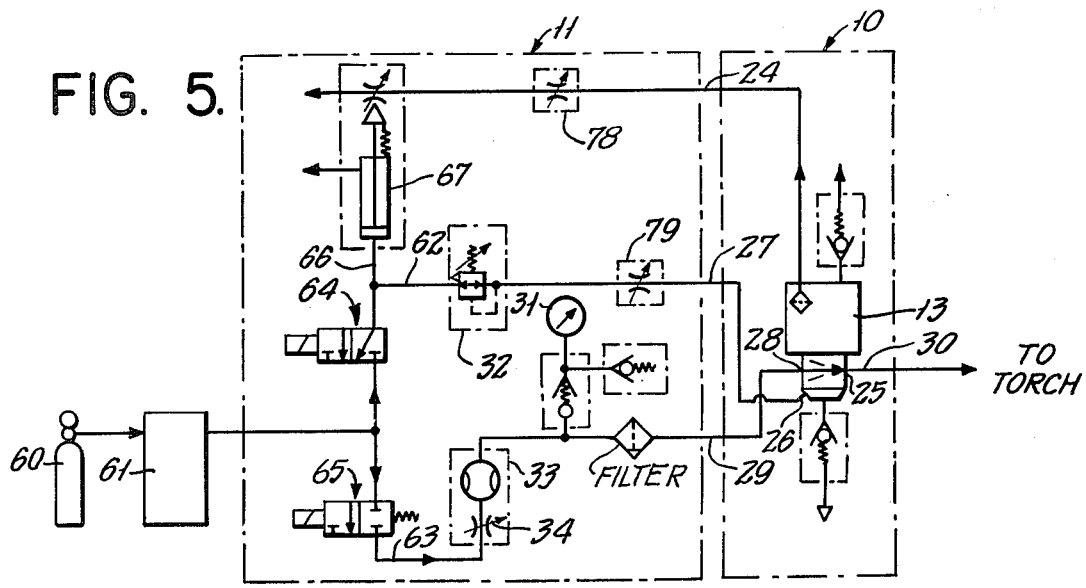
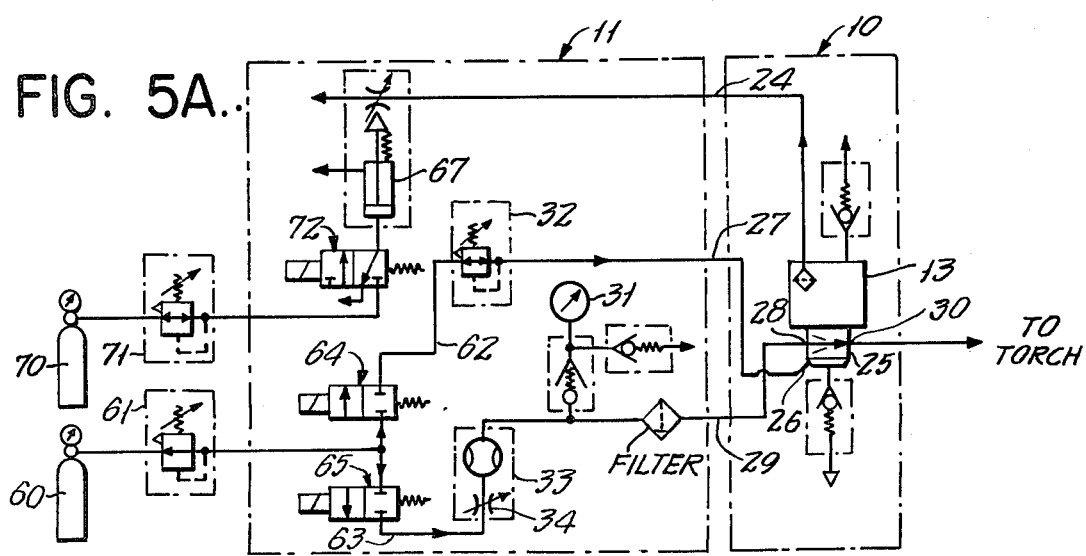

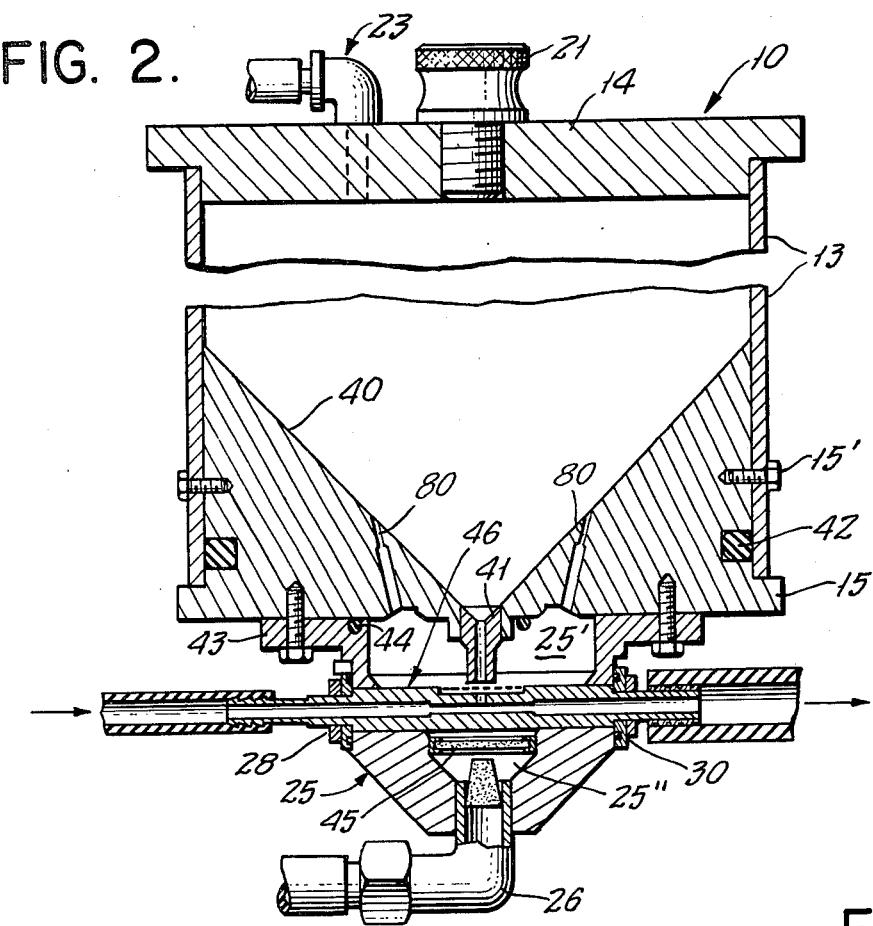
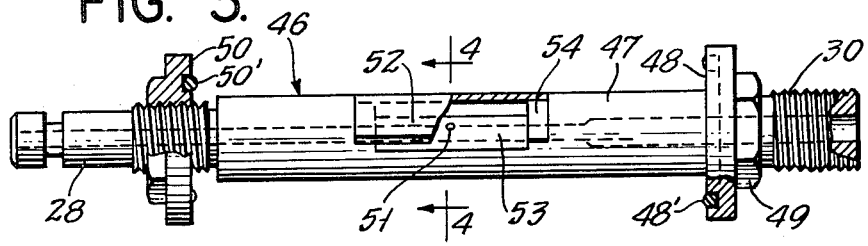
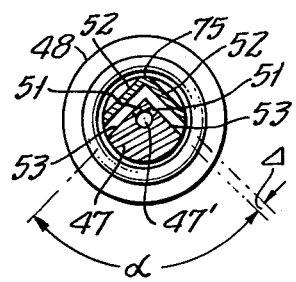
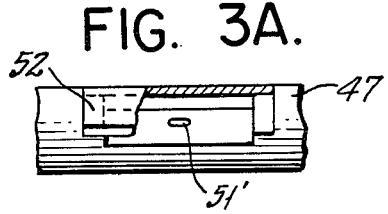
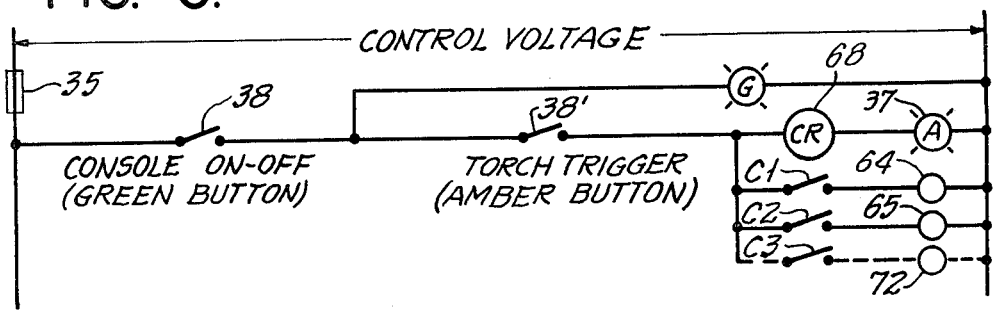

DEVICE FOR THE CONTROLLED FEEDING OF POWDER MATERIAL

BACKGROUND OF THE INVENTION

The invention relates to a powder-feeding system for gas-propelled delivery of a powder to be controllably supplied, as to a flame-spraying gas torch or to a transferred-arc plasma torch.

Various schemes have been proposed for the aspiration of powder into a flow of carrier gas, but these have lacked the precision with which it is desirable to controllably meter the delivery of powder to a torch for torch deposition to a surface to be coated or otherwise treated by the powder.

U.S. Pat. No. 3,976,332 attacks the problem by so configuring a downwardly open orifice in a carrier-gas tube within the convergent lower region of a powder-supply hopper that, in the presence of a fluidizing-gas flow from the top of the hopper and through the body of powder in the hopper, a fluidized powder regime will be established in the immediate vicinity of the orifice, thereby providing fluidized powder under pressure for conveyance by the carrier-gas flow. This technique has the disadvantage that the pressure drop of fluidizing-gas flow must necessarily be some function of the instantaneous head of undischarged powder within the hopper. And the patentee discloses a vibrator on the hopper wall as an aid in agitating undischarged powder in order to reduce this pressure drop.

BRIEF STATEMENT OF THE INVENTION

It is an object of the invention to provide an improved powder-feeding system of the character indicated, avoiding disadvantages of existing systems.

It is a specific object to meet the above object with a fluidizing powder-feeding system which, in its powder-feeding mode, avoids flow of fluidizing gas through any part of the hopper which contains the powder supply.

Another specific object is to meet the above objects with a fluidizing system which relies solely on gravity for restricted admission of powder to a fluidizing zone, the latter being otherwise separate from the hopper and its powder supply.

A further specific object is to meet the above objects with a fluidizing system in which, for a given range of controlling the pressure of fluidizing-gas delivery to the fluidizing zone, and for a given powder in loose particulate form, the rate of powder delivery is a substantially linear function of the controlled pressure of fluidizing-gas delivery.

A general object is to meet the above objects with relatively simple, readily serviced structure, inherently capable of powder-delivery at predetermined rates.

The invention achieves the foregoing objects and other features by providing a fluidizing chamber which is independent of the powder-supply hopper, except for a restricted vertical passage which permits solely a limited gravitational flow of powder into the fluidizing zone. The point of powder discharge into the fluidizing chamber is close to a shed which shields one or more openings through which fluidized powder is driven into a carrier-gas conduit, depending on the pressure of fluidizing-gas supply. A porous screen at the bottom of the fluidizing chamber assures distribution of fluidizing gas over a relatively large area which is at least coextensive with the shed. To cut off the powder-feed action, the fluidizing chamber is vented by venting the hopper.

DETAILED DESCRIPTION

A preferred embodiment of the invention will be described in detail in connection with the accompanying drawings, in which:

FIG. 1 is a front elevation of control and hopper-associated components of powder-feed apparatus of the invention;

FIG. 2 is an enlarged vertical sectional view through the hopper-associated components of FIG. 1;

FIG. 3 is a further enlarged view in elevation of powder-distributor structure in the apparatus of FIGS. 1 and 2, said view being partly broken-away and in vertical section;

FIG. 3A is a fragmentary view of an alternative arrangement for what is shown in a portion of FIG. 3;

FIG. 4 is a sectional view taken at 4—4 in FIG. 3;

FIG. 5 is a diagram schematically indicating gas-flow control connections for the apparatus of FIGS. 1 to 4;

FIG. 5A is a diagram similar to FIG. 5 to show a modification; and

FIG. 6 is an electrical ladder diagram for electrical circuitry associated with components of FIGS. 5 and 5A.

In the embodiment of FIG. 1, a powder-supply and dispensing unit 10 and its controls unit 11 are shown carried by a base 12. The unit 10 includes a cylindrical hopper body 13, with flanged upper and lower end-closure members 14–15, for containment of a supply of powder to be controllably dispensed; members 14–15 have telescoping fit to the bore of body 13 and are removably secured thereto, as at 14'–15'. A circumferential band 16 secured to body 13 provides means for pivotally supporting unit 10 about a horizontal pivot axis, via fixed mounting-hub structure 17 forming part of the housing of the control unit 11. An externally accessible knob 18 facilitates selective orientation of unit 10 about its pivot axis, the orientation being releasably secured by clamp means including a knurled ring 19.

The upper closure member 14 includes a handle 20 (for portability), a removable plug 21 (for powder-filling access to the inner volume of the hopper), a pressure-relief valve 22 (for safety, in the unlikely event of blockage to flow of gas under pressure), and a vent-connection fitting 23 from the inner volume of the hopper, and via flexible-hose connection 24, to vent-control means within unit 11.

The lower closure member 15 includes a gas-fluidizing chamber body 25 which will later be explained to receive a restricted gravitational supply of powder from within the hopper body 13. A fluidizing-gas supply connection 26 is made to the lower region of body 25, with flexible hose connection 27 to control means at 11; and a horizontal tubular powder distributor (to be described in connection with FIGS. 2, 3, and 4) has an inlet-end connection 28 for admission of a carrier-gas supply via a flexible hose 29 to further control means at 11. The other end 30 of the powder distributor is adapted for flexible-hose connection to a powder-spray torch or the like, as suggested by legend.

Externally exposed at the panel of control unit 11 is an indicator 31 of instantaneous back pressure, for carrier gas supplied in line 29 to the powder-distributor inlet connection 28; in the absence of powder injection, the indicator 31 will read a pressure which reflects the downstream impedance attributable to the powder distributor and its output connections, i.e., including the line to the utilizing torch. A knob 32, labeled "Powder Control", is in reality a manual means of adjustment of a pressure-regulator valve in the fluidizing-gas supply to line 27; when knob 32 is turned in the direction to admit a flow of fluidizing gas to connection 26, the back pressure reading at 31 will rise, almost directly in proportion to the rate of powder supply via the powder distributor, hence, the label "Powder Control" at knob 32. A second or flowmeter indicator 33 provides current readings of carrier-gas flow (being a pressure reading indicative of such flow) in the line 29 to connection 28; an associated adjustment knob 34 governs a variable orifice and is therefore a means of selecting flow rate, in re carrier gas supplied to inlet 28. A fuse 35, green and amber lamps 36–37, and an on-off switch 38 complete the panel; one of these lamps reveals the condition of switch 38, and the other lamp reveals the condition of an electrical relay (to be later described) which may be operated by remote on-off switch.

Referring now to FIGS. 2, 3 and 4 for internal detail, the lower end closure 15 of the hopper is seen to provide a conically dished bottom surface 40 for the hopper and to be provided (at its vertex) with a restricted vertical powder-discharge fitting 41, the conical slope of the concavity being preferably at least as steep as the angle of repose of the powder; an O-ring seal 42 assures powder-retaining integrity of the hopper bottom. The fluidizing-chamber body 25 is seen to be a flanged upwardly open cup, the open end of the cup being closed to complete definition of the fluidizing chamber, when the body flange 43 is secured to closure 15; an O-ring seal 44 assures powder-retaining integrity of the flange connection.

As shown, the fluidizing chamber comprises an upper region 25' of relatively large sectional area and a lower region 25" of relatively small sectional area, with a conical connecting zone of convergence from region 25' to region 25", the angle of convergence being preferably as steep as the angle of repose for powder to be distributed and fed. A gas-permeable porous screen (or microfilter) 45, of porous bronze, seats in a short counterbore contour of the lower region 25", above the elevation of fluidizing connection thereto (fitting 26), so that fluidizing gas flow will be distributed over the area of screen 45, as this flow discharges into the conical-connecting zone and into the upper region of the fluidizing chamber. The restricted-passage fitting 41 via which powder gravitationally enters the fluidizing chamber preferably projects downwardly through the upper region 25' for powder discharge into the convergent zone, in vertically spaced offset from screen 45.

The powder distributor 46, which extends horizontally from its carrier-gas inlet end 28 to its powder-delivery discharge end 30 is best shown in FIGS. 3 and 4. Advantageously, it comprises an elongate cylindrical body 47 having a central through-passage 47' for accommodating a flow of carrier gas. Its body 47 is removably insertable in horizontally aligned and diametrically opposed mounting bores through the fluidizing body 25, preferably in the convergent zone, being vertically interposed in clearance relation between the porous screen 45 and the powder-discharge end of fitting 41. Clamp nuts threaded to the respective ends of distributor body 47 may be used to clamp the same between local flats on the outer surface of body 25; however, in the form shown, the outlet end 30 of distributor body 47 includes an integral flange 48 with adjacent wrench flats 49 to enable a spanner-retained angular orientation while securing the same via a clamp nut 50 to threads at the inlet end 28. O-ring seals 48'–50' in the axially inner faces of flange 48 and nut 50 assure powder-retaining integrity of powder distributor 46 when in clamped assembly to body 25.

At a locally recessed central region of the distributor 46, one or more upwardly directed openings 51 enable powder fluidized within body 25 to enter the central passage of body 47 and thus to be conveyed via means 30 to torch or other utilization means. And a shed 52 carried by body 47 is interposed in vertical clearance relation between opening(s) 51 and the powder-discharge end of fitting 41. As shown, the central recess is defined by milled flats 53 parallel to the axis of body 47 and oppositely sloped at an included angle $\alpha$ which is at least no greater than twice the angle of repose of the powder, thereby assuring that when correctly oriented with respect to the vertical plane which includes the axis of body 47, no powder can adhere to either of the surfaces 53. Ledges 54 at longitudinal ends of the recess are parallel to adjacent flats 52 and at offset $\Delta$ therefrom, to provide precise and bonded seating for the respective roof panels of shed 52; these panels may be bent from flat stock, at the angle $\alpha$, and the panel thickness is such that the complete shed 52 is accommodated within the geometrical cylinder of body 47, thereby enabling the above-described removably insertable relation, in regard to fluidizing-chamber assembly. It is also noted that the lower edge limits of the roof panels are both at an elevation well below that of the opening(s) 51, thereby assuring against any direct entry of powder from fitting 51 to opening(s) 51.

In operation, the hopper 10 with a supply of powder to be gas-delivered at 30 is closed, i.e., no venting is available at 23–24. A predetermined flow of carrier gas is selected at 34, based on the indication at 33, and the back-pressure is noted at 31, for this no-powder condition. Thereafter, a predetermined powder flow is established by turning knob 32 to start and to increase the pressure-regulated flow of fluidizing gas in line 27 to the inlet 26 to chamber 25. The knob (32) setting will be such as to produce at 31 an indication of increased back pressure, the particular increase having been determined to be that which will produce the desired flow of powder via the distributor opening 51. As previously noted, any such knob (32)-operated change in the back pressure (indicated at 31), i.e., change in the back-pressure increase above the base reading for no-powder flow, will be substantially directly proportional to the powder flow. The immediate result of these selections, in the context of having operated switch 38 (and a remote-control switch, e.g., at the torch) to its "on" condition, is to cause the distributed flow of gas (issuing from screen 45) to operate upon and thus to fluidize such limited quantity of powder as may have been able to enter the fluidizing chamber and to drop from shed 52 to the screen. The fluidized powder quickly becomes uniformly dispersed throughout the volume of the fluidizing chamber, and the flow thereof via opening(s) 51 must be and is a direct function of the setting at 32. The effective area of opening(s) 51 is preferably less than that of the powder-discharge passage at 41, so that, as soon as hose 24 is vented, the ability to drive fluidized powder to or through opening 41 ceases altogether, thus immediately terminating the supply of powder via outlet 30.

In the electropneumatic circuitry of FIG. 5, many of the already identified components are schematically shown and are therefore given the previously assigned reference numbers. Basically, a single source 60 of gas under pressure (e.g., an inert gas, such as argon) is made available via supply control means 61 to separate lines 62-63 serving the variable pressure regulator 32 and the variable restrictive orifice 34 of a constant-flow flowmeter 33. Suitable solenoid-operated valves 64-65 in each of the lines 62-63 determine the on-off condition of gas flow therein. To coordinate venting of line 24 with the "off" condition of valve 64, a branch line 66 is shown operative upon the single-acting piston of a cylinder 67, wherein piston displacement against a return spring is necessary in order to pinch and thus close a flexible (e.g., neoprene tube) section of line 24. The pinched (closed) condition of line 24 assures against gas flow in or through the hopper, so that powder can be fluidized within chamber 25 and expelled only to outlet 30; on the other hand, the unpinched (open, venting) condition of line 24 dissipates pressure within the fluidizing chamber 25, to the extent that this pressure is insufficient to drive any fluidized material through the opening(s) 51.

The ladder diagram of FIG. 6 illustrates electrical control connections for coordinating above-described functions. In this diagram, the on-off switch 38 determines overall electrical availability for operation, and a further on-off switch 38' (the remote-control switch alluded to above) determines whether a contactor relay 68 will be excited; as also noted above, the switch 38' may be operated by the torch trigger, in the event that the powder supply is to such a torch. Relay 68 has a plurality of normally open contacts (C1, C2, C3), which close simulataneously upon relay excitation. Contact C1 is connected for operation of the solenoid for normally closed valve 64, and contact C2 is connected for operation of the solenoid for normally closed valve 65.

In the modified electropneumatic circuitry of FIG. 5A, and independent supply 70 of pressurized gas (e.g., air) is made exclusively available for pinch control of the vent mechanism. For this purpose, the branch line 66 of FIG. 5 is replaced by series-connected pressure-regulator means 71 and normally open solenoid-valve means 72. And the C3 contact connections of FIG. 6 determine excitation of the solenoid of valve means 72, in unison with the other two solenoid valves 64-65.

It will be appreciated that certain dimensions of the described apparatus are dependent upon the size and density of the particulate powder material employed. Thus, the truncation slopes 53 should be at least as steep as the angle of repose of the powder material, and if flat (as shown) the roof panels 52 should meet the same slope requirement. The area of overlap provided by shed 52 over and beyond opening(s) 51 should be so extensive as to avoid any chance of direct powder travel from passage 41 to opening(s) 51. The combined sectional area of opening(s) 51 is preferably less than that afforded for venting chamber 25 via means 24. The length of each opening 51, from a flat 53 to the carrier-gas passage 47', is preferably about the effective diameter of the opening 51, or less. And the effective sectional area of each opening 51 is much smaller than the sectional area of the carrier-gas passage 47', at juncture therewith. Preferably also, the juncture of roof panels 52 is characterized by a narrow horizontal flat 75 (FIG. 4) which extends the full length of the shed, and the width of said flat is approximately the discharge diameter of the powder passage 41, while said flat is spaced from passage 41 to about the same extent, thus enabling an effective throttling of powder admission to chamber 25, in the absence of fluidizing conditions.

It will be seen that the described powder-feeding apparatus meets all stated objectives, and that the principle of operation is applicable to a variety of powder-feeding uses, involving various types of dry materials, for purposes other than the described context for supplying powder to a torch. The screen 45 diffuses the fluidizing gas and assures that powder will be fluidized (and therefore will not permit a powder surge) during any given delivery cycle. The ability to deliver powder for any given application will depend upon the number of openings 51 beneath shed 52. For example, for a particular metal powder to be fluidized and supplied by the described apparatus, the following different ranges of powder feed rate are available with the same size distributor body 47 wherein only the size and/or number of openings 51 is modified:

| Low Range | 0.5 lb/hour to 8 lbs/hour |
| Medium Range | 4 lbs/hour to 22 lbs/hour |
| High Range | 10 lbs/hour to 35 lbs/hour |
| Super High Range | 15 lbs/hour to 50 lbs/hour |

In the specific case of feeding a flame-spraying metallic powder identified as Eutoloy #16496, being a commercially available alloy* product of Eutectic Corporation, New York, the above-stated low range is achievable for the described condition of two openings 51, where each opening 51 is of 0.041-inch diameter and perpendicular to its associated flat 53, where each opening 51 is 0.03-inch long and the carrier-gas passage 47' is of 0.067-inch diameter at juncture with openings 51, the shed gap (e.g., offset $\Delta$ of roof panels 52 to adjacent flats 53) being 0.060-inch. The foregoing operation is achieved for selected constant flow-rate of carrier gas at 15 to 20 standard cubic feet per hour, while the fluidizing gas pressure is regulated within the range 0.5 to 5 psi. Generally speaking, for the indicated specific powder and application, the length of openings 51 (i.e., from passage 47' to the associated flat 53) is preferably in the range 0.010 to 0.030 inch, and the shed gap $\Delta$ is preferably in the range 0.015 to 0.060 inch.

*An alloy of nickel, chromium, boron and silicon.

As long as the supply of powder in hopper 13 is sufficient to cover the opening of the restrictive feed element 41, and, of course in the circumstance of such powder being free-flowing, the powder level in hopper 13 has no effect on the powder-delivery rate at 30. Repeatability is found to be in the range ±3 percent, and the back-pressure reading at 31 (i.e., above the back-pressure reading for no powder flow) is found to be directly proportional to the feed rate for a specific material and powder lot.

While the invention has been described in detail for a preferred form, it will be understood that modification can be made without departure from the scope of the invention. For example, as a means of enlarging the effective area for fluidized-powder entry to passage 47', without reducing the elevation thereof above the lower limiting edges of shed 52, the opening may be of slotted nature, exemplified by the longitudinal elongate slot 51' of FIG. 3A. Also, to increase the effective sectional area through which the venting of chamber 25' is achieved via hopper 13, an angularly distributed plurality of vent passages 80 (see FIG. 2) may be provided in end closure 15; the size of these openings 80 should be less than sufficient to admit powder to chamber 25', and they are shown with a divergent pattern of distribution so that they may serve the function of transiently agitating the lower region of the hopper upon each vented termination of fluidized-powder delivery.

Still further, in certain cases, it is found desirable to avoid sharp transients in the starting and/or in the termination of powder feed. This is achievable by providing a bleed orifice 78 in series relation with the venting line 24, in the case of powder-feed termination, and a bleed orifice 79 in series relation with the fluidizing-gas inlet line 27, in the case of a start-up of powder feed. Preferably, each of these orifices 78–79 is selectively adjustable to accommodate the conditions of a particular job; orifices 78–79 may thus each be a needle valve, as schematically suggested in FIG. 5.

What is claimed is:

1. A powder-feeding system for gas-propelled delivery of a powder to be supplied in loose particulate form, wherein the powder has a characteristic angle of repose, said system comprising:
   (a) an enclosed hopper for containing a supply of the powder,
   (b) a fluidizing chamber beneath said hopper and a restricted vertical passage connecting said chamber to said hopper for gravitational delivery of powder into said chamber,
   (c) a fluidizing gas-supply connection to said chamber in vertically downward offset below said vertical passage, said fluidizing gas-supply connection including a gas-permeable porous screen positioned to effectively define the bottom of said chamber so that flow of fluidizing gas supplied to said chamber will be distributed over the area of said screen,
   (d) a gas conduit extending through said chamber in the region of said offset and having a carrier-gas supply connection at one end and a gas-propelled powder-delivery connection at its other end,
   (e) said gas conduit in the region of said vertical passage having an upwardly directed opening to said chamber for conduct of gas-fluidized powder from said chamber and into said conduit, and
   (f) a shed interposed between and in vertically spaced relation from both said passage and said opening, said shed being of such substantially greater overlapping area than said opening in relation to its spacing from said opening that no gravity flow of powder into said chamber can pass into said opening in the absence of a fluidizing gas flow via said fluidizing gas-supply connection.

2. The powder-feeding system of claim 1, in which said hopper includes selectively operable venting means of flow-handling capacity exceeding that of said conduit; whereby in the absence of a venting condition of said venting means fluidized powder will be delivered to said conduit, but when said venting means is operated no fluidizing powder will be delivered to said conduit.

3. The powder-feeding system of claim 2, in which said fluidizing gas-supply connection includes selectively operable means for determining the on-off condition of fluidizing gas supplied to said chamber, and interlocking means coordinating the selectively operable "on" condition of said fluidizing gas-supply connection with the selectively operable non-venting condition of said venting means, and vice versa.

4. The powder-feeding system of claim 2, in which said venting means includes a solenoid-operated valve, connected to vent in the absence of solenoid excitation.

5. The powder-feeding system of claim 4, in which said fluidizing gas-supply connection includes a solenoid-operated valve, connected to shut off supply of fluidizing gas in the absence of solenoid excitation; and in which control means is selectively operative to excite and to de-energize said valve solenoids in unison.

6. The powder-feeding system of claim 5, in which said carrier-gas supply connection includes a solenoid-operated valve, connected to shut off supply of carrier gas in the absence of solenoid excitation; said control means being operative to excite and to deenergize all said valve solenoids in unison.

7. The powder-feeding system of claim 5, in which said control means includes the powder-flow control of a flame-spraying gas torch having a powder-flow input connection supplied by said other end of said conduit.

8. The powder-feeding system of claim 2, in which said venting means serially includes a restrictive bleed orifice, whereby a sharp transient is avoided in the termination of powder feed upon operation of said venting means.

9. The powder-feeding system of claim 8, in which said bleed orifice is selectively variable.

10. The powder-feeding system of claim 2, in which said fluidizing gas-supply connection serially includes a restrictive bleed orifice, whereby a sharp transient is avoided in the initiation of powder-feed upon supply of fluidizing gas to said connection.

11. The powder-feeding system of claim 10, in which said bleed orifice is selectively variable.

12. The powder-feeding system of claim 1, in which said vertical passage is one of a plurality of passages communicating between said hopper and said chamber.

13. The powder-feeding system of claim 12, in which said vertical passage is of sectional area exceeding that of each of the remaining passages of said plurality, and a selectively operable vent connection to said hopper.

14. The powder-feeding system of claim 3, in which said vertical passage extends through a substantial upper volume of said chamber prior to discharge at relatively close offset above said shed, remaining passages of said plurality being open only to the upper end of said chamber and at vertical elevations above the powder-discharge end of said vertical passage.

15. The powder-feeding system of claim 14, in which said remaining passages are in angularly spaced relation about said vertical passage, the horizontal section of the upper end of said chamber being of extent to embrace all said remaining passages, said screen being of area less than said extent, and said chamber having sidewall surfaces convergent from said extent to the effective confines of said screen area at a convergent slope which is at least as great as the powder angle of repose.

16. The powder-feeding system of claim 1, in which said fluidizing gas-supply connection includes a pressure-regulating valve.

17. The powder-feeding system of claim 16, in which said regulating valve is selectively variable, whereby the rate of powder delivery to said conduit may be selectively controlled.

18. The powder-feeding system of claim 16, in which said carrier-gas connection includes valve means for delivering a flow of carrier gas to said conduit such that a predetermined constant volumetric flow rate characterizes flow at the powder-delivery end of said conduit.

19. The powder-feeding system of clam 18, and carrier-gas back-pressure indicating means operatively connected to said carrier-gas connection between said valve means and said upwardly directed opening.

20. The powder-feeding system of claim 18, in which said valve means is selectively variable to determine a selected magnitude of said constant volumetric flow rate.

21. The powder-feeding system of claim 1, in which the bottom of said hopper is a conical concavity of tapered slope which is at least as steep as said angle of repose.

22. The powder-feeding system of claim 1, in which said upwardly directed opening is of sectional area smaller than that of said conduit at the location of communication with said conduit.

23. The powder-feeding system of claim 1, in which said upwardly directed opening is of circular section and of length at least no greater than its diameter.

24. The powder-feeding system of claim 23, in which said length is less than said diameter.

25. The powder-feeding system of claim 1, in which said upwardly directed opening is one of two spaced openings, respectively angularly offset on opposite sides of the geometrical vertical plane which locally includes the conduit axis.

26. The powder-feeding system of claim 25, in which at the region of shed overlap of said openings, said shed has a horizontal line peak between two symmetrically opposed downwardly sloping flat roof panels, the angle between said panels being at least as small as twice the powder angle of repose.

27. The powder-feeding system of claim 26, in which said conduit is characterized beneath said roof panels by flat chordal surface truncations in spaced parallel relation to the applicable adjacent roof panel, one of said openings being at one truncation, and the other of said openings being at the other truncation.

28. The powder-feeding system of claim 27, in which said conduit is locally recessed to define said truncations, the longitudinal ends of said roof panels being sealed to said recesses, and the outer longitudinal edges of said panels being beneath the elevation of said openings.

29. The powder-feeding system of claim 1, in which said upwardly directed opening is one of a plurality of spaced openings, all of which are overlapped by said shed.

30. The powder-feeding system of claim 29, in which said upwardly directed opening is one of an even-number plurality, symmetrically angularly offset on opposite sides of the geometrical vertical plane which locally includes the conduit axis.

31. The powder-feeding system of claim 1, in which said upwardly directed opening is a slotted opening, elongate in the direction of the conduit axis.

32. The powder-feeding system of claim 1, in which said enclosed hopper comprises an elongate cylindrical tubular body closed at its upper end, and a base having sealed removable telescoping fit to the lower end of said body, said restricted vertical passage being central of and through said base.

33. The powder-feeding system of claim 32, in which mounting means for said hopper includes a pivotal suspension on a horizontal axis through a longitudinal central region of said body.

34. The powder-feeding system of claim 33, in which said mounting means includes a releasable clamp for retaining a selected pivotal orientation of said body.

35. Powder-feeding means for gas-propelled delivery of a powder to be supplied in loose particulate form, comprising a fluidizing-chamber body having an internal fluidizing-chamber cavity having an upper region of substantially larger sectional area than its lower region and having a convergent region between said upper and lower regions, powder-supply means including a restricted vertical tubular powder-inlet passage projecting downward from the upper end of said body and through said upper region for downward discharge of powder into said convergent region, a fluidizing gas-supply connection including a gas-permeable porous screen positioned in said lower region to effectively define the bottom of said chamber so that flow of fluidizing gas supplied to said body beneath said screen will be distributed over the area of said screen, and a gas conduit extending transversely of the convergent region of said chamber cavity, said conduit having a carrier-gas supply connection at one end and a gas-propelled powder-delivery connection at its other end, said gas conduit in the region of said vertical passage having an upwardly directed opening to said chamber for conduct of gas-fluidized powder from said chamber and into said conduit, and a shed interposed between and in vertically spaced relation from both said passage and said opening, said shed being of such substantially greater overlapping area than said opening in relation to its spacing from said opening that no gravity flow of powder into said chamber can pass into said opening in the absence of a fluidizing gas flow via said fluidizing gas-supply connection.

36. The powder-feeding means of claim 35, in which said powder-supply means includes selectively operable means for selectively and effectively closing and opening said passage to a venting of gas supplied to said chamber cavity.

37. The powder-feeding means of claim 35, in which aligned transverse bores at opposed locations in the convergent region of said body are adapted for removably inserted assembly of said conduit and shed to said body.

38. The powder-feeding means of claim 37, in which said conduit comprises an elongate cylindrical conduit body having axially spaced regions to fit the respective conduit-body bores, said conduit body having a truncation intermediate said axially spaced regions and said upwardly directed opening being exposed within said truncation, said shed being within the geometrical cylinder of said conduit body and spanning the axial extent of the truncation.

39. The powder-feeding means of claim 38, in which said conduit body includes clamp formations adjacent said axially spaced regions for removably retaining an assembled relation of said conduit body to said chamber body.

* * * * *